US012491653B2

(12) United States Patent
Weiss et al.

(10) Patent No.: US 12,491,653 B2
(45) Date of Patent: Dec. 9, 2025

(54) SLICING MACHINE WITH BLADE MOUNTING DEVICE

(71) Applicant: MULTIVAC SEPP HAGGENMUELLER SE & CO. KG, Wolfertschwenden (DE)

(72) Inventors: Hans Christian Weiss, Dillenburg (DE); David Schlicker, Steffenberg-Steinperf (DE)

(73) Assignee: Multivac Sepp Haggenmueller Se & Co. KG, Wolfertschwenden (DE)

(*) Notice: Subject to any disclaimer, the term of this patent is extended or adjusted under 35 U.S.C. 154(b) by 585 days.

(21) Appl. No.: 17/839,697

(22) Filed: Jun. 14, 2022

(65) Prior Publication Data

US 2022/0395996 A1 Dec. 15, 2022

(30) Foreign Application Priority Data

Jun. 14, 2021 (DE) ......................... 102021115309.3

(51) Int. Cl.
*B26D 7/06* (2006.01)
*B26D 1/14* (2006.01)

(52) U.S. Cl.
CPC ............. *B26D 7/0625* (2013.01); *B26D 1/14* (2013.01)

(58) Field of Classification Search
CPC .... B26D 7/0625; B26D 1/14; B26D 2621/02; B26D 2210/02; B26D 7/225; B26D 7/2635; B26D 2210/08; B26D 5/02; B26D 1/48; B26D 1/143; B24B 45/006; B27B 5/32; Y10T 29/49963; Y10T 83/9399; Y10T 403/7007; Y10T 83/04; Y10T 83/7726
USPC .............................................................. 83/86
See application file for complete search history.

(56) References Cited

U.S. PATENT DOCUMENTS

| | | | | |
|---|---|---|---|---|
| 5,188,011 A * | 2/1993 | Somal | .................... | B26D 7/225 83/DIG. 1 |
| 7,509,902 B2 | 3/2009 | Weber | | |
| 9,962,782 B2 * | 5/2018 | Nispel | .................... | B23D 61/02 |
| 10,589,439 B2 * | 3/2020 | McGuffin-Noll | .... | B26D 7/2621 |
| 11,890,771 B2 * | 2/2024 | Schalow | .............. | B26D 7/2621 |

(Continued)

FOREIGN PATENT DOCUMENTS

| | | |
|---|---|---|
| DE | 298 23 154 U1 | 4/1999 |
| DE | 101 48 595 A1 | 4/2003 |

(Continued)

OTHER PUBLICATIONS

German Search Report Dated Apr. 28, 2022, Application No. 10 2021 115 309.3, Applicant MULTIVAC Sepp Haggenmueller SE & Co. KG, 13 Pages.

*Primary Examiner* — Ghassem Alie
(74) *Attorney, Agent, or Firm* — Brooks Kushman P.C.

(57) ABSTRACT

A slicing machine for slicing product calibers into slices comprises a cutting unit including a blade shaft having a blade support, and a plate-shaped or bowl-shaped blade which is detachably fastenable to the blade support of the blade shaft and rotatably driveable about a blade axis. The slicing machine further comprises a feed unit for feeding at least one caliber in a feeding direction to the cutting unit, a discharge conveyor for discharging at least one separated slice, and a mounting device to facilitate mounting and dismounting of the blade at the blade support.

16 Claims, 12 Drawing Sheets

(56) References Cited

U.S. PATENT DOCUMENTS

| | | | | |
|---|---|---|---|---|
| 2009/0013845 | A1* | 1/2009 | Zhu | B26D 7/00 83/663 |
| 2011/0179922 | A1* | 7/2011 | Weber | B26D 7/2635 83/477.1 |
| 2011/0197728 | A1 | 8/2011 | Redemann et al. | |
| 2011/0314992 | A1 | 12/2011 | Ishihara | |
| 2012/0122100 | A1* | 5/2012 | Sampath | C12Q 1/6858 435/6.12 |
| 2013/0035221 | A1 | 2/2013 | Weber | |

FOREIGN PATENT DOCUMENTS

| | | | |
|---|---|---|---|
| DE | 10 2011 109 067 | A1 | 2/2013 |
| DE | 10 2016 108 034 | A1 | 11/2017 |
| DE | 10 2016 118 212 | A1 | 3/2018 |
| EP | 1 232 841 | A2 | 8/2002 |
| EP | 3 124 189 | A2 | 2/2017 |

* cited by examiner

SLICING MACHINE WITH BLADE MOUNTING DEVICE

CROSS-REFERENCE TO RELATED APPLICATION

This application claims priority to German Patent Application No. DE 102021115309.3 filed on Jun. 14, 2021, the disclosure of which is incorporated in its entirety by reference herein.

TECHNICAL FIELD

The invention relates to slicing machines, in particular so-called slicers, with which strands of an only slightly compressible product such as sausage or cheese are cut into slices in the food industry.

BACKGROUND

Since these strands can be produced with a cross section that retains its shape and dimensions well over its length, i.e., essentially constant, they are often called product calibers.

In most cases, several product calibers arranged parallel to each other are cut open at the same time by the same rotating blade, which moves in a transverse direction to the longitudinal direction of the product calibers, cutting off one slice at a time.

The product calibers are pushed forward by a feed conveyor of a cutting unit towards the blade of the cutting unit, usually on a downward inclined feed conveyor, so that the slices, which are already at an angle when they are cut, fall smoothly onto a discharge conveyor of a discharge unit, by means of which they are transported away for further processing.

Accordingly, the blade is also mounted with its blade plane at an angle and overhanging to the front, which makes it difficult to dismount and remove the plate-shaped blade, which is up to 60 cm in diameter and weighs 20-30 kg and has an extremely sharp cutting edge around its circumference.

In this context, it is known from EP 3124189 A1, for example, that the entire slicing unit, including the blade and blade drive, is attached to a transfer device that is part of the slicing machine and is displaced relative to the rest of the slicing machine.

This means that the blade can not only be positioned in different cutting positions within the slicing machine, but can also be moved out of the rest of the slicing machine with the help of the transfer device—which, however, always remains connected to the slicing machine—so that it is more easily accessible there and can be dismantled more easily.

However, there is still the problem that the blade is heavy and dangerously sharp and poses a hazard if removed from the transfer device without protection.

SUMMARY

It is therefore the object of the invention to provide a slicing machine, in particular a slicer, which is capable of countering the aforementioned problem and at the same time has a high level of process reliability.

With regard to a slicing machine, such as a slicer, the slicing machine comprises the following components:

A cutting unit with a plate-shaped or bowl-shaped blade which can be driven in rotation about a blade axis and which is dismountably attached to a blade shaft, a feed unit for feeding at least one caliber in the feeding direction to the cutting unit, a discharge conveyor for conveying the at least one separated slice, a control for controlling movable parts of the slicing machine, and this object is solved in that the slicing machine comprises a mounting device by means of which the mounting and dismounting of the blade on the blade shaft of the slicing machine is facilitated, and the blade carrier of which, which is a component of the mounting device and can be positioned there at one, preferably several different, defined positions, temporarily receives the blade for this purpose.

Preferably, the blade carrier—with or without the blade attached—is completely re-movable from the slicing machine. In a less preferred embodiment, it is a permanent part of the slicing machine, but can be moved to such a position in or at the slicing machine that the blade attached to it is more accessible to a worker next to the machine than in the position mounted on the blade support.

The blade carrier is preferably embodied and adapted to the blade in such a way that the blade is also accommodated and in particular held in or on the blade carrier in a defined position and, preferably, only in a defined position, for which it can usually be fastened to the blade carrier.

The blade can be moved by means of the mounting device and the blade carrier between a mounting position close to the blade shaft and a loading position, which serves to remove the blade with the blade carrier from the slicing machine, preferably manually, for example by moving or pivoting the blade carrier.

The mounting position is a position in which the blade is so close, preferably in contact, and in such a position relative to the blade support, also in its rotational position around the blade shaft, that it can be fixed, in particular screwed, relative to the blade support for slicing operation.

The loading position is a position from which the blade carrier can be removed from the slicing machine. If the insertion or removal process of the blade carrier into or out of the machine involves a movement in the transverse direction of the machine, i.e., transversely to the passage direction of the products through the machine, preferably in a horizontal direction, the loading position is the position in which, viewed from above, the rotation axis of the blade fixed to the blade carrier is already in the longitudinal center plane of the machine, in which the rotation axis of the blade mounted on the machine is also located.

In addition, there can be a protective position of the blade carrier, in which the blade carrier serves as a protective device during the slicing operation against a blade wholly or partially detaching and flying away during rotation and for this purpose must assume a small distance in the axial direction to the blade and of course must also assume a defined position in the transverse directions.

The blade carrier can be inserted into and removed from the machine using different mechanisms and movement sequences.

In a first embodiment, the mounting device comprises at least one, preferably two, drawer guides running parallel to each other on or in the slicing machine as well as a drawer which serves as a blade carrier for temporarily receiving the blade and can be inserted into or onto one or between the two drawer guides and can be pushed along them in the transverse direction to the blade axis, preferably in the horizontal direction, into the slicing machine until the loading position.

The at least one drawer guide extends transversely to the passage direction of the products through the machine, preferably in a horizontal direction.

In this case, the guide plane defined by the two guides or the main plane of the drawer attached to one guide can either exclusively assume a position parallel to the blade plane of a mounted blade or be pivoted away from this parallel position as a mounting position into a non-parallel loading position and vice versa.

In any case, the guide plane for inserting the blade into the slicing machine is so far away from the blade plane of the mounted blade that the insertion of the drawer can be passed despite the parts of the slicing unit projecting towards the drawer—e.g., a central pin of the blade shaft or an additional weight or balance weight of the blade support projecting towards the guide plane—even with the blade in the drawer.

In a preferred embodiment, the drawer guide is pivotable around a horizontal, transverse axis, preferably around one of the two drawer guides, and in the removal position folded away from the blade plane, the drawer can be pushed in to the correct transverse position, the loading position, in order, by pivoting the drawer towards the blade shaft in the assembly position, either during assembly to bring the blade fastened to the rear side of the blade support facing the product, i.e., the drawer, into contact with the blade shaft, i.e., its blade support, and to fasten it to the latter, or during disassembly to bring the drawer as blade support into contact with the blade, to fasten the latter to the drawer and then to release the connection of the blade to the blade support.

In a second embodiment, the mounting device again comprises a blade carrier for attaching a blade thereto in a defined position, as well as a slider guide rod lying in the transverse direction to the direction of passage, preferably in the horizontal, to which the blade carrier can be suspended by means of hang-up hooks provided at its upper end region.

This facilitates the assembly process, as the attachment does not have to take place at an exact transverse position.

As the blade carrier is therefore not yet in the correct transverse position, the assembly position, when it is attached, the blade carrier can be moved along the slider guide rod to a corresponding stop.

The slider guide rod as well as the attachment hooks on the blade support are dimensioned and positioned in such a way that the blade support can then be swiveled around the slider guide rod—usually manually—until it reaches the mounting position in which the blade is closely adjacent to or in contact with the blade support and can be bolted to it.

For this purpose, the blade carrier can be locked in this mounting position.

For this purpose, the slider guide rod preferably has a round outer circumference and preferably the attachment hooks have an analogous inner contour or the slider guide rod is rotatably mounted at its ends.

To prevent unintentional detachment of the blade carrier from the slider guide rod, a locking device is provided on the blade carrier and/or the hang-up hooks, which automatically locks the blade carrier to the slider guide rod after it has been attached, so that the blade carrier can only be removed from the slider guide rod again after this locking device has been actively unlocked.

In order to fix the blade in a defined position on the blade carrier, a blade holding device can be provided on the blade carrier, whereby simple rotary latches are already sufficient for this.

Furthermore, there is preferably a stop on at least one of the drawer guides which limits the insertion of the blade carrier and, in particular, there is a locking element which locks the blade carrier in the position in which it is pushed in as far as the stop.

It is essential that the blade support has a recess, in particular a window, which is dimensioned and positioned in such a way that, when the blade is correctly positioned on the blade support, all the screw holes of the blade lie within the window to allow the blade, which is still held by the blade support, to be screwed to the blade support.

The method of mounting or dismounting the blade in a slicing machine such as a slicer, in particular on a slicing machine according to any one of the preceding claims, by means of such a mounting device comprising a blade support, is thus performed by, when mounting by means of a mounting device comprising a blade support,

- A) the blade carrier (29) with the blade (3) attached to it is inserted into the slicing machines (1) and brought into the loading position (LP),
- B) the blade carrier (29) is moved from the loading position (LP) to the mounting position (MP) in which the blade (3) is in such a position that it can be fastened, in particular screwed, to the blade support (7A),
- C) the blade (3) is fixed to the blade support (7A),
- D) the blade carrier (29) after loosening its connection to the blade (3)
  - either is brought into a protective position (SP) at a distance, in particular an axial distance, from the blade (3), and is used as part of the protective cover for the blade during slicing operations
  - or moved to the loading position (LP) and removed from the slicing machine (1) and, if necessary, transported away and stored.

The loading position (LP) can—depending on the embodiment of the mounting device (30)—also be identical with the protection position (SP).

When dismantling by means of a mounting device comprising a blade carrier, on the other hand, the procedure is such that

- a) the empty blade carrier (29)
  - if it is in the protective position (SP), is moved to the mounting position (MP),
  - if it is outside the slicing machine (1), is inserted into the slicing machine (1) until it reaches a loading position (LP),
- b) from there the blade carrier (29) of the mounting device (30) is brought into the mounting position (MP) and thus in particular into contact with the blade (3),
- c) the blade (3) is attached to the blade carrier (29) and detached from the blade support (7A),
- d) the blade carrier (29) with the blade (3) is removed from the slicing machine (1) and, if necessary, transported away and stored.

This makes it easier and safer to install or remove the blade from the slicing machine than with previous methods and auxiliary devices.

In step a), in particular, the empty blade carrier is inserted into the slicing machines by sliding it along drawer guides transverse to the rotation axis of the blade, in particular in the horizontal direction or by attaching the blade carrier to a slider guide rod.

In step b), the blade carrier of the slicing machine is brought into contact with the blade by moving—moving or pivoting—against the passage direction of the slicing machine.

In step c) in particular, the blade is fastened to the blade carrier by screwing.

In step d), the blade carrier and the blade in particular are removed from the slicing machine by pulling them out against the direction of insertion, for example from the drawer guides or from the slider guide rod.

In particular, between steps b) and c), the blade carrier is locked in the contacting position to the blade.

In this case, between step c) and step b), the blade carrier in particular is unlocked in the contacting position to the blade.

The assembly process is analogous in reverse.

BRIEF DESCRIPTION OF THE DRAWINGS

Embodiments according to the invention are described in more detail below by way of examples, showing.

DETAILED DESCRIPTION

Figure 1A:
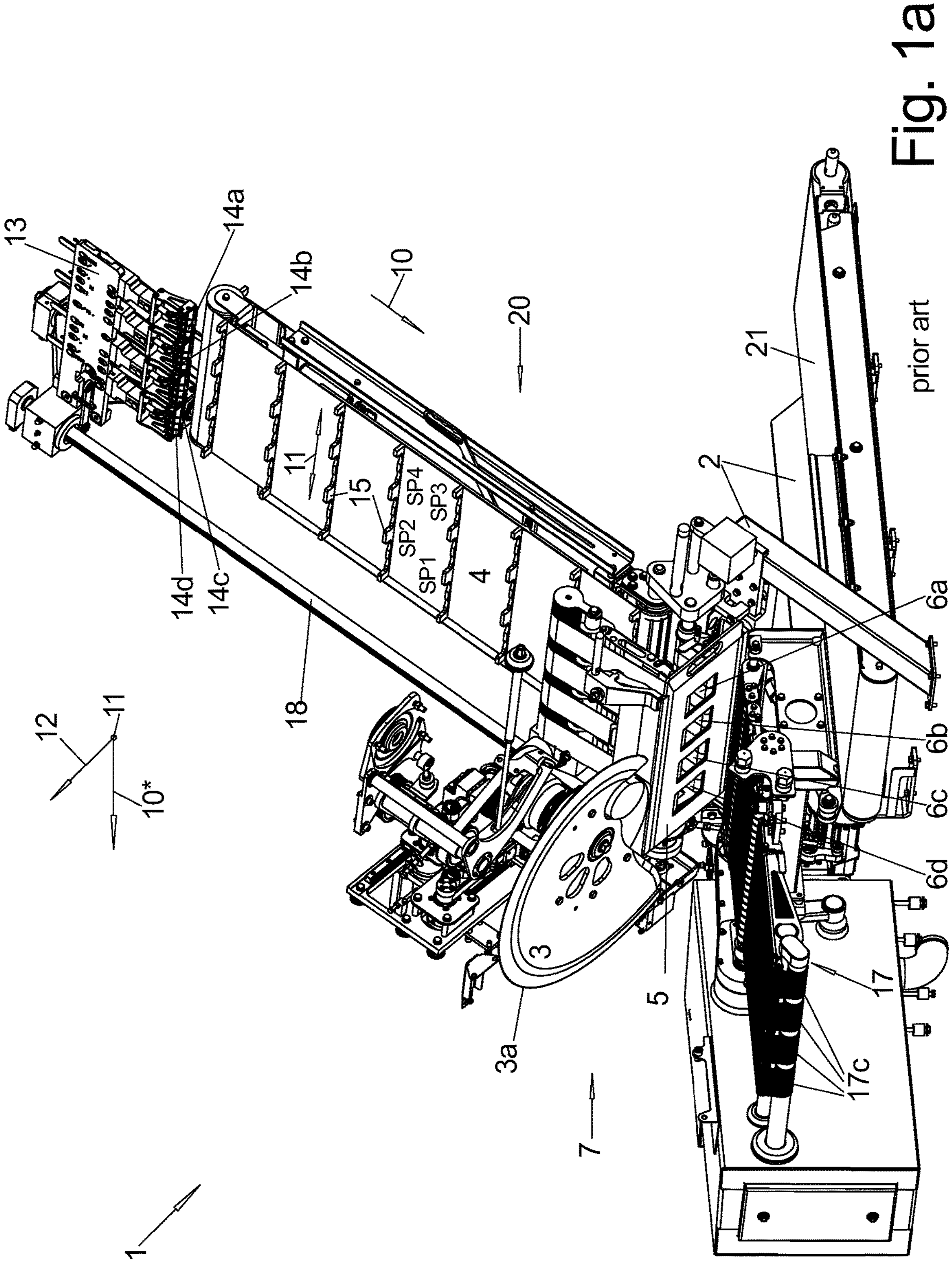
FIG. 1*a, b*: A slicing machine in the form of a slicer according to the state of the art in different perspective views, with the feed belt tilted up into the slicing position.
Figure 1B:
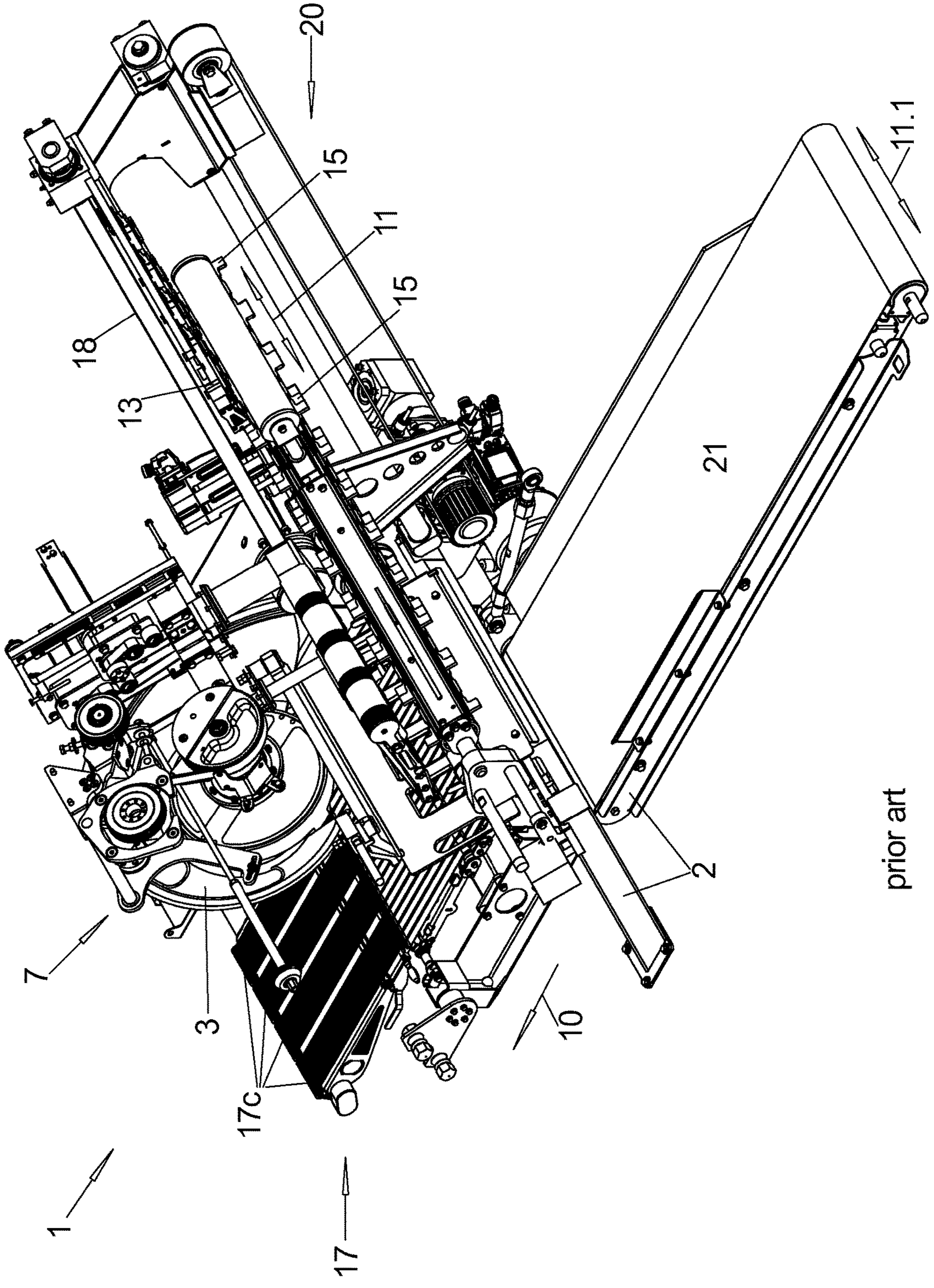
FIG. 1*c*: the slicing machine of FIG. 1*a, b* in side view with the panels removed so that the various conveyor belts can be seen more clearly, but with the feed belt tilted down into the loading position and the product caliber cut except for a caliber rest.

FIGS. 1*a*, 1*b* show different perspective views of a multi-track slicer 1 for simultaneously slicing several product calibers K on one track SP1 to SP4 next to each other and depositing them in shingled portions P each consisting of several slices S with a general passage direction 10* through the slicer 1 from right to left.

Figure 1C:
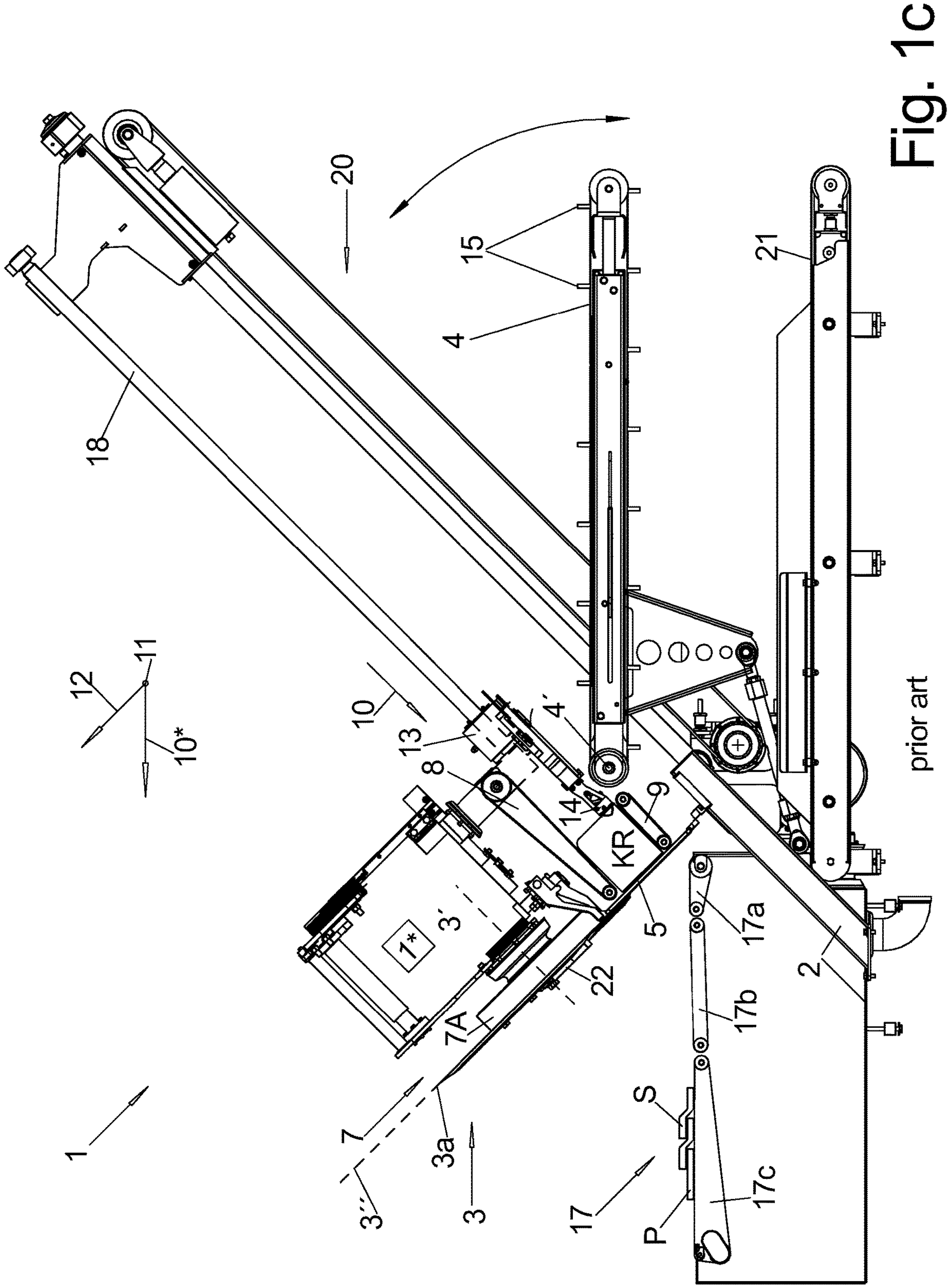
Figure 2A:
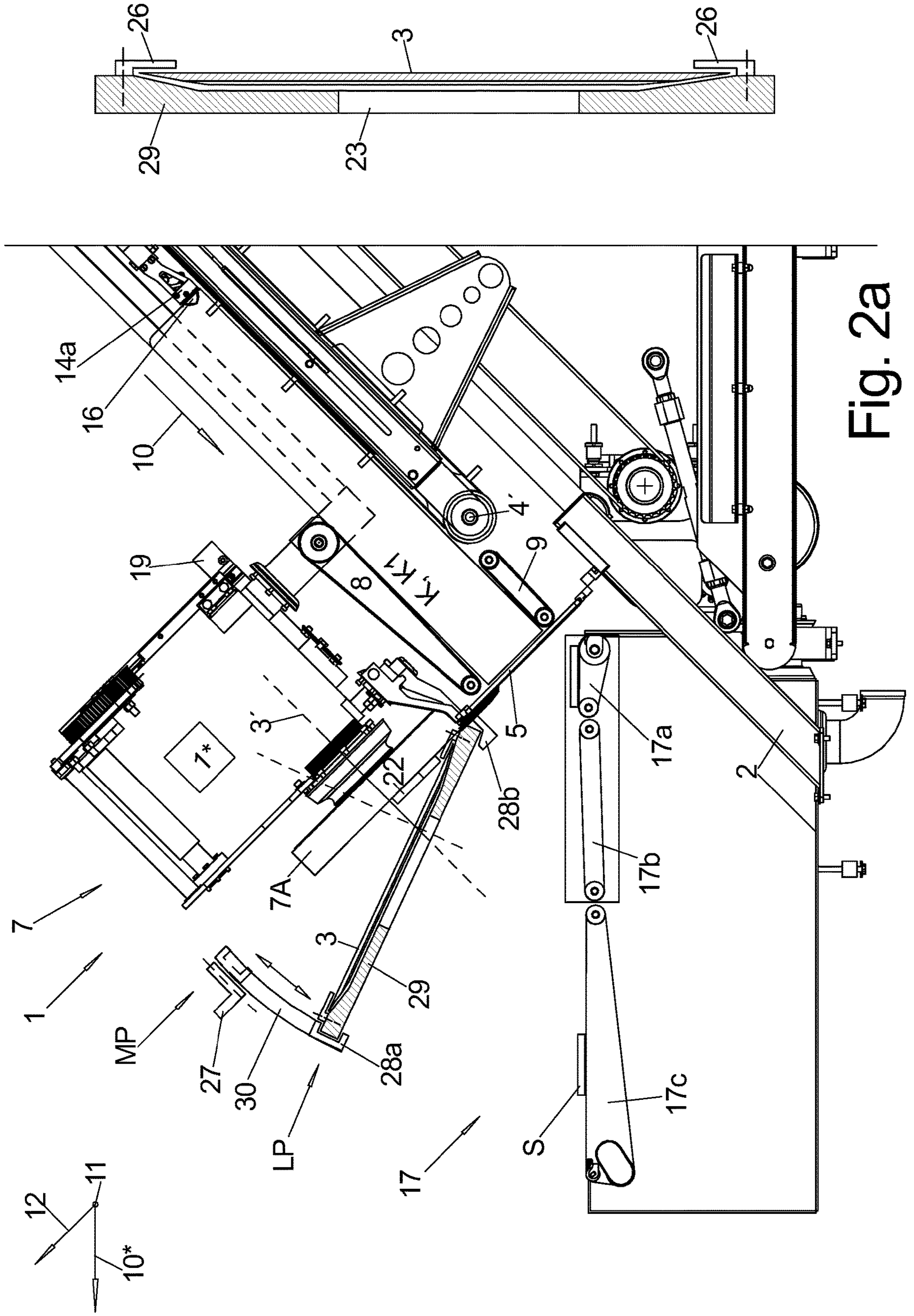
FIGS. 2*a-d*: different functional positions of a 1st construction design of the assembly device according to the invention when mounting a blade, in analogous viewing direction as in FIG. 1*c*, but with the feed conveyor folded up into the cutting position as in FIG. 1*a, b*, whereby in FIG. 2*a* the blade carrier with inserted blade is additionally shown separately enlarged.

FIG. 1*c* and FIG. 2*a* show—with the caliber K inserted—a side view of this slicer 1, omitting covers and other parts not relevant to the invention, which are attached to the base frame 2 just like all the other units, so that the functional parts, especially the conveyor belts, can be seen more clearly. The longitudinal direction 10 is the feeding direction of the calibers K to the cutting unit 7 and thus also the longitudinal direction of the calibers K lying in the slicer 1.

It can be seen that the basic structure of a slicer 1 according to the state of the art is that a cutting unit 7 with blades 3 rotating about a blade axis 3', such as a sickle blade 3, is provided with several, in this case four, product calibers K lying transversely to the feeding direction 10 next to each other on a feed conveyor 4 with projections of the feed conveyor 4 projecting from the support surface as spacers 15 in between are fed by this feed unit 20, from the front ends of which the rotating blade 3 cuts a slice S with its cutting edge 3*a* in each case in one operation, i.e., almost simultaneously.

For cutting the product calibers K, the feed conveyor 4 is in the cutting position shown in FIG. 1*a, b*, 2*a-d*, which is inclined in the side view with the cutting-side front end lying low and the rear end lying high, from which it can be tilted down about a pivot axis 20' running in its width direction, the first transverse direction 11, which is located in the vicinity of the cutting unit 7, into an approximately horizontal loading position, as shown in FIG. 1*c*.

The rear end of each caliber K lying in the feed unit 20 is positively held by a gripper 14*a-d* with the aid of gripper claws 16, as shown in FIGS. 2*a-d*. These grippers 14*a*-14*d*, which can be activated and deactivated with regard to the position of the gripper claws 16, are attached to a common gripper slide 13, which can be moved along a gripper guide 18 in the feeding direction 10.

In this case, both the feed of the gripper slide 13 and of the feed conveyor 4 can be driven in a controlled manner, whereby, however, the actual feed speed of the calibers K is effected by a so-called upper and lower product guide 8, 9, which are also driven in a controlled manner and which engage on the upper side and lower side of the calibers K to be cut open in their front end regions near the cutting unit 7:

The front ends of the calibers K are each guided through a so-called eyeglass opening 6*a-d* of a plate-shaped cutting frame 5, whereby the cutting plane 3", in which the blade 3 rotates with its cutting edge 3*a* and thus cuts off the protrusion of the calibers K from the cutting frame 5 as a slice S, moves directly in front of the front end face of the cutting frame 5, which points downwards at an angle. The cutting plane 3" runs perpendicular to the upper run of the feed conveyor 4 and/or is spanned by the two transverse directions 11, 12 to the feeding direction 10.

Here, the inner circumference of the product openings 6*a-d* of the cutting edge 3*a* of the blade 3 serves as a counter cutting edge.

Since both product guides 8, 9 can be driven in a controlled manner, in particular in-dependently of each other and/or possibly separately for each track SP1 to SP4, these determine the—continuous or clocked—feed speed of the calibers K through the cutting frame 5.

The upper product guide 8 can be displaced in the 2nd transverse direction 12—which is perpendicular to the surface of the upper run of the feed conveyor 4—in order to adapt to the height H of the caliber K in this direction. Furthermore, at least one of the product guides 8, 9 can be embodied to run around one of its deflecting rollers in order to be able to change the direction of the strand of its guide belt lying against the caliber K to a limited extent.

The slices S, which are at an angle in the space when they are separated, fall onto a discharge unit 17 which starts below the cutting frame 5 and runs in the passage direction 10*, and which in this case consists of several discharge conveyors 17*a, b, c* arranged one behind the other with their upper runs approximately aligned in the passage direction 10*, of which the first discharge conveyor 17*a* in the passage direction 10 can be designed as a portioning belt 17*a* and/or one can also be designed as a weighing unit.

The slices S can hit the discharge conveyor 17 individually and at a distance from each other in the passage direction 10* or, by appropriate control of the portioning belt 17*a* of the discharge conveyor 17—the movement of which, like almost all moving parts, is controlled by the control 1*—form shingled or stacked portions P, by stepwise forward movement of the portioning belt 17*a*.

Below the feed conveyor 20 there is usually a roughly horizontal residue conveyor 21, which starts with its front end below the cutting frame 5 and directly below or behind the discharge conveyor 17 and with its upper run thereon—by means of the drive of one of the discharge conveyors 17 against the passage direction 10—transports falling rest pieces to the rear.

Figure 2B:
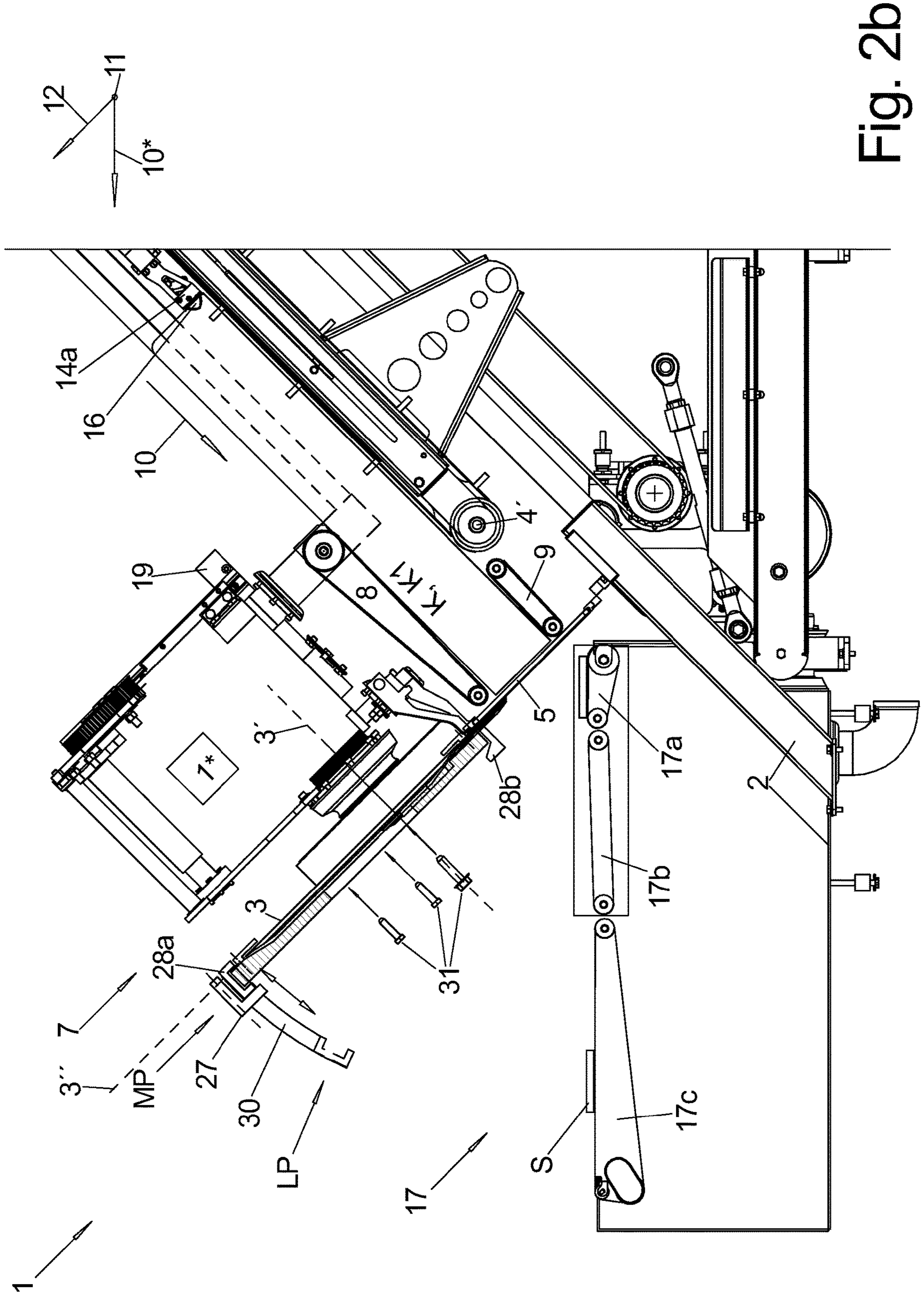
Figure 2C:
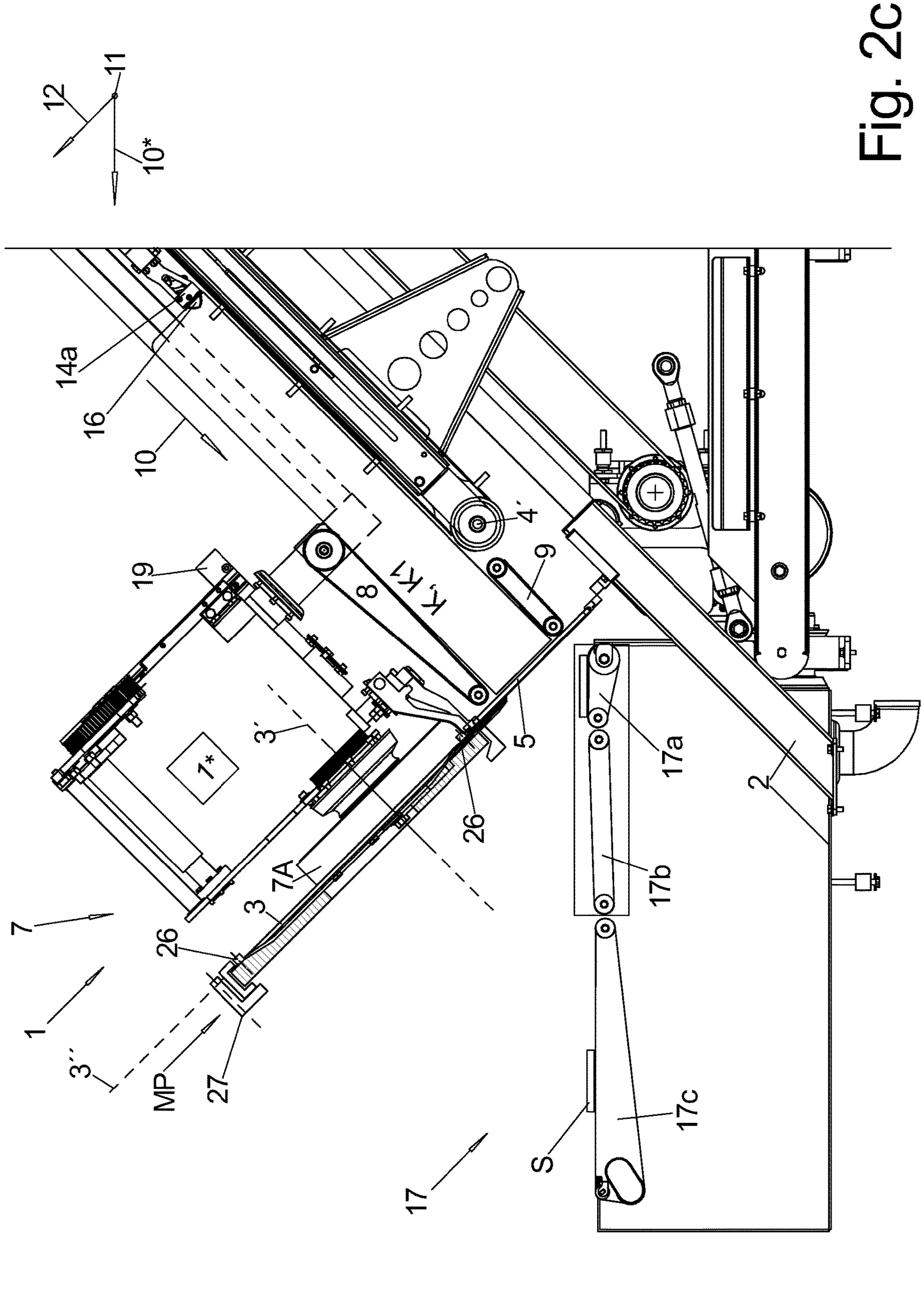
Figure 3:
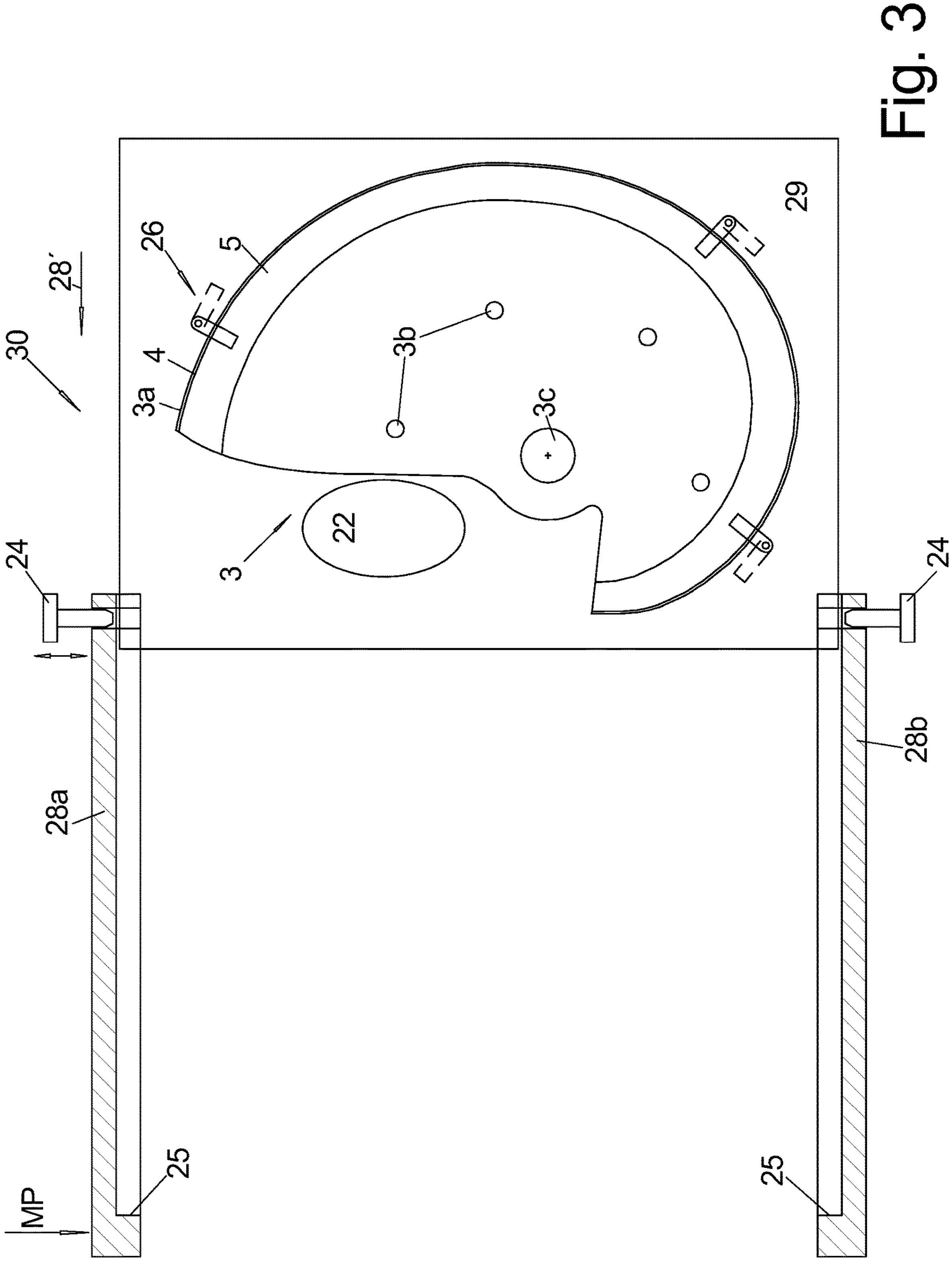
FIG. 3: the blade carrier with the blade inside, viewed in the direction of the blade axis of this blade, partially inserted into the drawer guides, FIG. 4*a, b*: various functional positions of an extended 1st design of the mounting device according to the invention when mounting a blade, in analogous viewing direction as in FIGS. 2*a* to 2*d*, FIG. 5*a, b*: various functional positions of a 2nd design of the mounting device according to the invention when mounting a blade, in analogous viewing direction as in FIGS. 2*a* to 2*d*.

FIGS. 2*a*-2*c* show the side view of the slicing machine 1 showing the process of mounting a new blade on the blade support 7A, which rotates with the blade shaft and on whose front surface, in this case pointing downwards to the left, the blade 3 must be screwed, whereby a balancing weight 22 projects over this mounting surface of the blade support 7A in a partial area in order to compensate for the asymmetrical shape of the blade 3, which is designed as a sickle blade, as can be seen in FIG. 3.

The mounting device 30 comprises on the one hand two drawer guides 28*a*, 28*b*, which have an approximately U-shaped cross section visible in FIGS. 2*a*-2*d* and are directed towards each other with their U-openings, and are dimensioned and spaced in such a way that a plate-shaped blade carrier 29 can be inserted between them, as shown in FIG. 3 and already done for mounting a new blade in FIG. 2*a*.

At least one of the drawer guides, in this case the upper drawer guide 28*a*, can be pivoted back and forth by a limited angle of about 20° relative to approximately the lower drawer guide 28*b* or the lower edge of the inserted blade carrier 29, preferably about a pivot axis lying in the horizontal transverse direction 11 to the blade axis 3'.

The lower drawer guide 28*b* can be embodied with regard to its U-shaped recess in such a way that a blade carrier 29 guided in the drawer guides 28*a, b* is held securely and with sufficient positional accuracy in this lower drawer guide 28*b*, irrespective of which of the two swivel positions the upper drawer guide 28*a* is in, whereby a pivoting capability of this lower drawer guide 28*b* can be dispensed with.

For this purpose, the left, lower flank of the U-opening of the then mostly no longer pivoting drawer guide 28*b* is tapered towards the bottom of the U-recess.

Mounting a new blade 3 is carried out as follows: First of all, outside the slicing machine, i.e., with the blade carrier 29 pulled completely out of the drawer guides 28*a, b*—which is also shown enlarged in FIG. 2*a*—the desired new blade 3 is placed on the blade side of the blade carrier 29, usually in a slight recess provided there.

The blade holding devices 26, shown here in the form of rotary latches 26, distributed around the circumference of the inserted blade 3, are then closed so that they thereby hold the blade 3 securely and in an exact relative position to the blade carrier 29, which, in the case of a rotary latch 26 as a blade holding device, only requires the rotary latch to be rotated by about 90° so that the holding lug of the rotary latch projects radially inwards over the blade 3.

Then the blade carrier 29 together with the blade 3 is pushed in the insertion direction 28'—see FIG. 3—between the two drawer guides 28*a, b* until it comes to rest against a stop 25 formed on one or both of the drawer guides 28*a, b*. The blade carrier 29 can be secured in this end position, the assembly position MP, by activating a locking element 24, such as a locking pin pretensioned into the locking position. In this end position, the assembly position MP, the blade carrier 29 can be secured by activating a locking element 24, such as a locking pin biased into the locking position, which can be provided on one or both of the drawer guides 28*a, b*.

During insertion, one or both of the in this case pivoting drawer guides 28*a, b* is in its loading position LP swiveled away from the blade support 7A, which must be pivoted away from the blade support 7A, that when the blade carrier 29 together with a blade 3 is pushed in, there is no collision with the balance weight 22 projecting over the front side of the blade support 7A or with another part of the blade support 7A which, with a blade 3 mounted on the blade support 7A—see FIG. 1*c*—projects axially not only over the blade support 7A but even over the blade 3.

From this loading position LP, the blade carrier 29 is pivoted upwards together with at least the pivoting, in this case upper drawer guide 28*a*—usually operated manually, not by motor—into the assembly position MP, in which the blade 3 is located with its blade plane 3" parallel and preferably in contact with the front surface of the blade support 7A.

In this assembly position MP, the upper drawer guide 28*a* is first secured against unintentional lowering by means of a carrier holding device 27, which in turn can consist of a simple rotary latch mounted stationary on the machine.

If the blade 3 is correctly mounted in the blade holder or carrier 29 and the blade carrier 29 is correctly positioned against the stop 25 in the drawer guides 28*a, b*, the screw holes 3*b* and any central opening 3*c* of the blade 3 should be aligned with the mating elements behind them, e.g., threaded holes in the blade support 7A. The screw holes 3*b* and any central opening 3*c* of the blade 3 should now be aligned with the mating elements behind them, i.e., threaded holes, of the blade support 7A, so that—as shown in FIG. 2*b*—the blade 3 can now be screwed to the blade support 7A using corresponding retaining screws 31, since the screw holes 3*b* are all located in the area of the one or more windows 23 through the blade carrier 29.

Figure 2D:
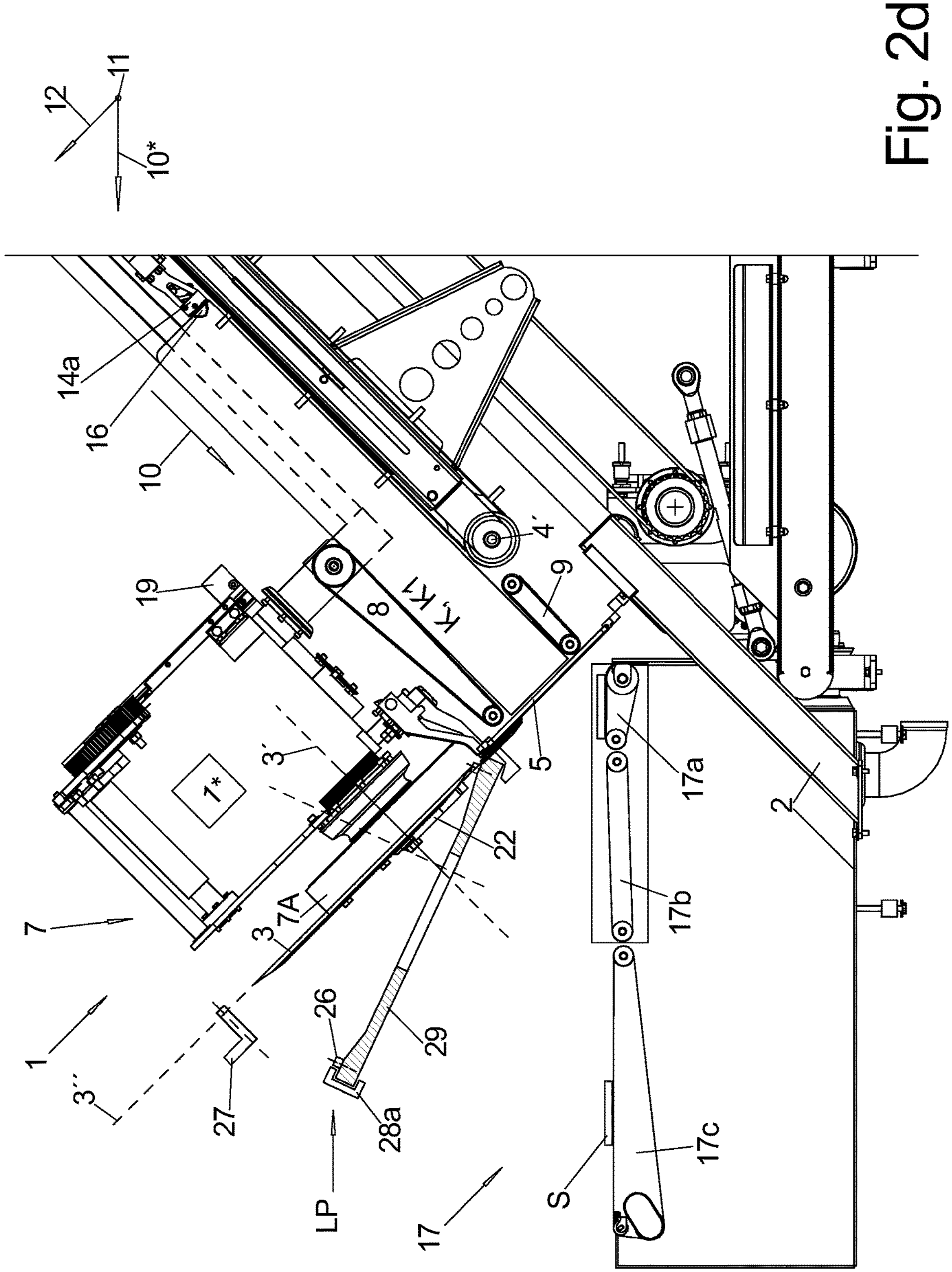

After the blade 3 has been mounted in the slicing machine 1 in this way and fixed to the blade support 7A, the blade holding devices 26 are first deactivated as shown in FIG. 2*c* and the carrier holding device 27 is also deactivated as shown in FIG. 2*d*.

The upper drawer guide 28*a* together with the blade carrier 29 can then be swiveled back down to the loading position LP and the blade carrier 29 can be removed from the drawer guides 28*a, b* and thus from the slicing machine 1 by pulling it out to the side.

Figure 4A:
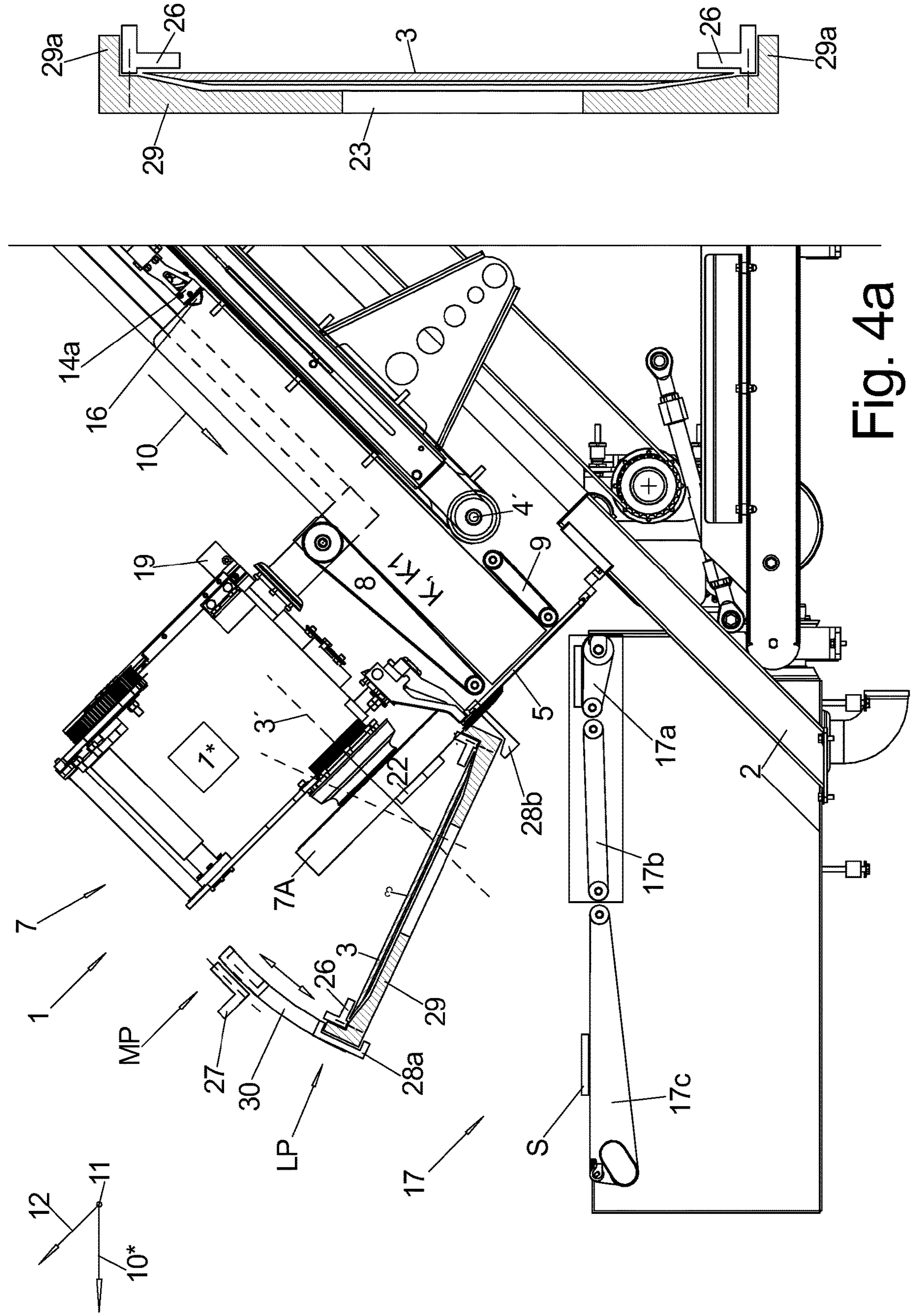
Figure 4B:
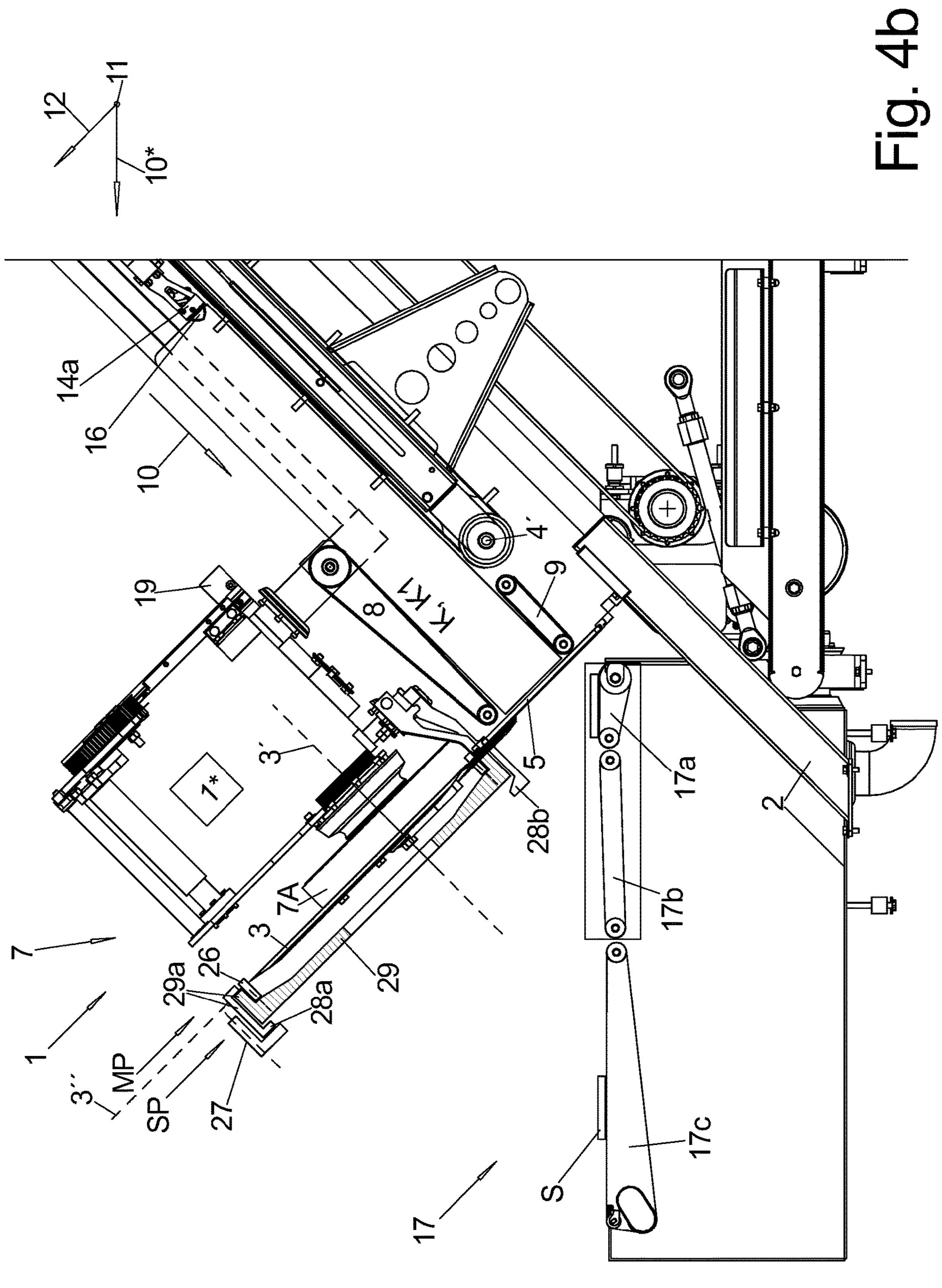

FIG. 4*a, b* show an extension of the 1st design of FIGS. 2*a* to 2*d:*

FIG. 4*a* shows the blade carrier 29 already retracted into the loading position LP with the blade 3 attached to it in the same way as in FIG. 2*a*. However, in the enlarged cross-sectional view of the blade carrier 29 in FIG. 4*a*, it can be seen that, in addition to the plate-shaped base body, it now has an edge 29*a* projecting further over the blade 3 on both sides of the blade.

After the blade carrier 29 with the blade 3 has been swiveled up into the mounting position MP, the blade 3 has been fixed to the blade support 7A and the blade holding device 26 has been released, the blade carrier 29—instead of being removed from the slicing machine 1 without the blade—can now be moved to a certain distance from the blade 3, e.g., in the direction of the blade axis 3'. In this protective position SP, the blade carrier 29 offers protection against a blade 3 or blade parts flying away.

Preferably, for this purpose, in the protective position SP the blade carrier 29 is axially distanced from the blade 3 only to such an extent that the blade plane 3" still passes through the projecting, circumferential edge 29*a* of the blade carrier 29.

For this purpose, both drawer guides 28*a, b* can preferably be moved together from the mounting position MP to the protective position SP, i.e., preferably in the axial direction of the blade axis 3', and fixed there.

Figure 5A:
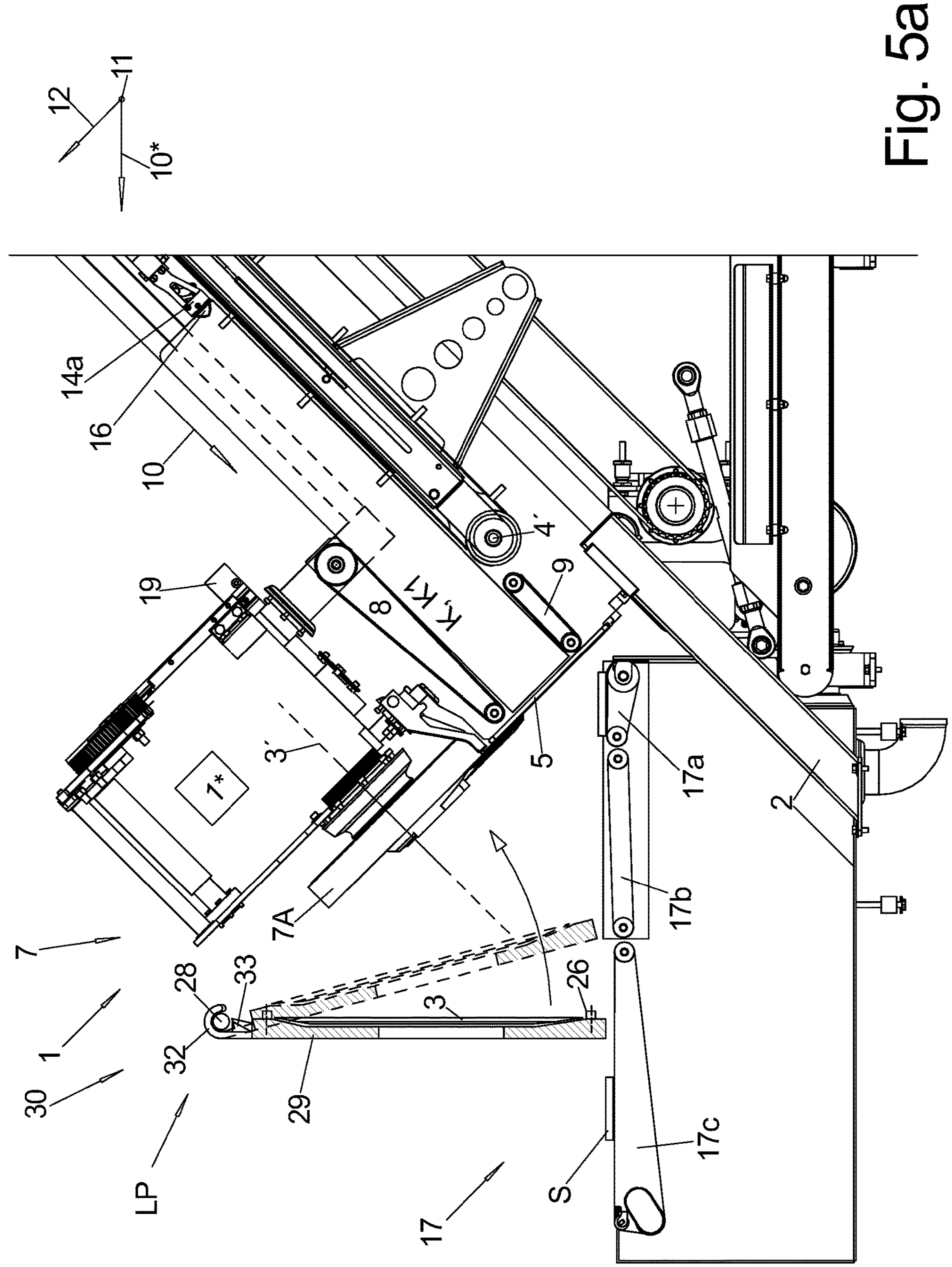

FIG. 5*a, b* show a 2nd design of the assembly device 30, in which assembly operations are facilitated by the fact that the insertion of the blade 3, which is held on a blade carrier 29, into the slicing machine 1 is very simple in that the operator only has to hook the blade carrier 29 with hang-up hooks 32 projecting therefrom in the upper region onto a slider guide rod 28, which runs horizontally in the transverse direction 11, so that the blade carrier 29 then hangs downwards from the rod 28 under the force of gravity.

In this suspended position, the blade carrier 29 is automatically locked by means of a locking device 33 shown here on the hang-up hooks 32, so that without actively unlocking this locking device 33, the blade carrier 29 can no longer unintentionally detach from the bar 28.

In the direction of view of FIG. 5*a*, behind the last hang-up hook 32 there is a stop analogous to the stop 25 in FIG. 3, so that the blade carrier 29, initially suspended in a not exactly defined transverse position, only has to be pushed in the direction of view of FIG. 5*a*, the transverse direction 11, up to this stop and has then reached its loading position LP.

Figure 5B:
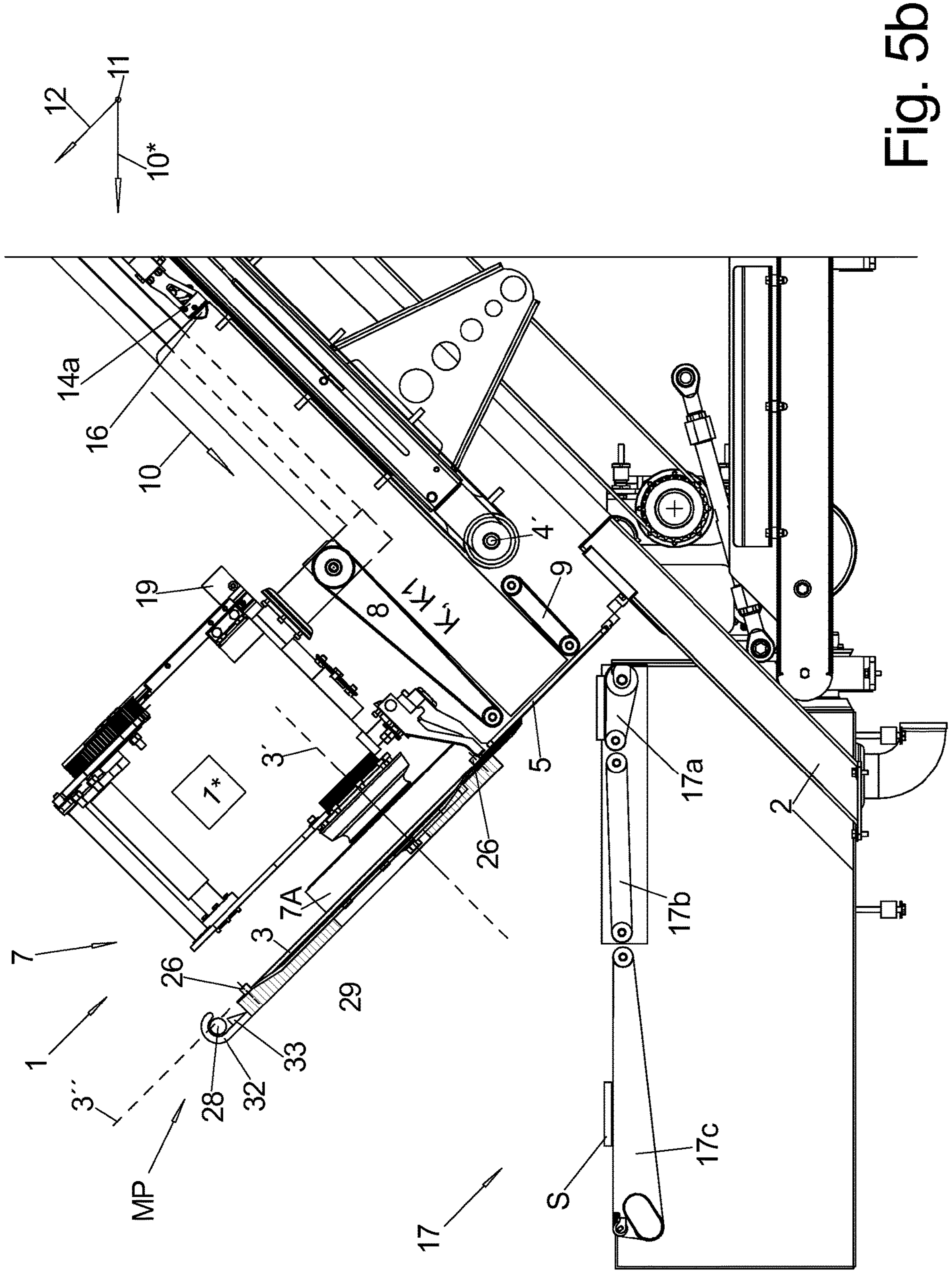

The rod 28 and the attachment bars or hang-up hooks 32 are positioned or dimensioned and fastened in relation to the blade carrier 29 in such a way that by simply pivoting the blade carrier 29 upwards around the slider guide rod 28, which has a round outer contour for this purpose, in the direction of the blade support 7A, the blade support 29 reaches its mounting position MP, in which the blade 3 it supports can be screwed to the blade support 7A, as has already been done in FIG. 5*b*.

Of course, also with this design the blade carrier 29 can be temporarily secured in this mounting position MP, e.g., by means of a carrier holding device 27 not shown at the lower end of the blade carrier 29, as shown analogously at the upper end in FIG. 2*c*.

After the blade holding device 26 has been released and the blade carrier 29 alone has been pivoted back into the vertically suspended starting position as in FIG. 5*a*, the blade carrier 29 can be unhooked from the bar 28 and removed from the machine by actively, usually manually, unlocking the locking device 33.

Of course, it can also be provided in this 2nd design that instead of removing the empty blade carrier 29, it is merely brought to a small distance from the blade 3 mounted in the machine into a protective position SP and in this position serves as part of the blade cover during slicing operation.

REFERENCE LIST

1 slicing machine, slicer
1* control
2 base frame
3 blade
3 rotation axis
3" blade plane, cutting plane
3*a* cutting edge
3*b* bolting opening
3*c* central opening
4 feed conveyor, feed belt
cutting unit
6*a-d* product opening
7 cutting unit
7A blade support
8 upper product guide, upper guide belt
8.1 contact run, lower run
8*a* cutting side deflecting roller
8*b* deflecting roller facing away from the cutting side
9 bottom product guide, lower guide belt
8.1 contact run, upper run
9*a* cutting side deflecting roller
9*b* deflecting roller facing away from the cutting side
10 transport direction, longitudinal direction, axial direction
10* passage direction through machine
11 1. transverse direction (width slicer)
12 2. transverse direction (height-direction caliber)
13 gripper unit, gripper slide
14.14 *a-d* gripper
15 projection, spacer
16 gripper claw
17 conveyor unit
17*a, b, c* portioning belt, discharge conveyor
18 gripper guide
19 height sensor
20 feed unit
21 end piece conveyor
22 balance weight
23 window
24 latching element
25 stop
26 blade holding device, rotary latch
27 carrier holding device, rotary latch
28 slider guide rod
28*a, b* drawer guide
28' guide direction
28" guide plane
29 blade carrier
29*a* edge
30 mounting device
31 retaining screw
32 hang-up hook
33 locking device
K product, product caliber
KR end piece
LP loading position
MP mounting position
S slice
P portion

The invention claimed is:

1. A slicing machine for slicing product calibers into slices, the slicing machine comprising:

a cutting unit including a blade shaft having a blade support, and a plate-shaped or bowl-shaped blade which is detachably fastenable to the blade support of the blade shaft and rotatably driveable about a blade axis, a feed unit for feeding at least one caliber in a feeding direction to the cutting unit, a discharge conveyor for discharging at least one separated slice, and a mounting device to facilitate mounting and dismounting of the blade at the blade support, wherein the mounting device comprises:

a blade carrier at which the blade is receivable, and drawer guides for receiving the blade carrier as a drawer between the drawer guides when the blade carrier is move in guide direction along the drawer guides, wherein the blade carrier is configured to temporarily receive the blade on a side of the blade carrier facing the blade support when the blade carrier is received in the drawer guides, and wherein on at least one of the drawer guides there is a stop which limits insertion of the blade carrier and/or a locking element is provided which locks the blade carrier in a correct insertion position.

2. The slicing machine according to claim 1, wherein the blade can be held in a defined position at the blade carrier, and the blade carrier is movable between a mounting position close to the blade shaft and either a loading position for removal from the slicing machine, or a protective position for covering the blade during a slicing operation.

3. The slicing machine according to claim 2, wherein a carrier holding device is provided to fix the blade carrier in the mounting position.

4. The slicing machine according to claim 2, wherein a blade holding device is provided on the blade carrier to fix the blade in the defined position on the blade carrier.

5. The slicing machine according to claim 2, wherein the blade carrier has a recess which is dimensioned and positioned in such a way that, when the blade is correctly positioned on the blade carrier all screw holes of the blade are aligned with the recess, and with the blade carrier in the mounting position on the slicing machine, a balancing weight present on the blade support extends into the recess.

6. The slicing machine according to claim 1, wherein the blade carrier is movable back and forth along the drawer guides between a position just guided in the drawer guides, and a loading position in which the blade axis of the blade held on the drawer guides is located at a same transverse position in a transverse direction as the blade axis of the blade when the blade is mounted on the blade support.

7. The slicing machine according to claim 1, wherein the guide direction is transverse to the blade axis.

8. The slicing machine according to claim 1, wherein at least one of the drawer guides is displaceable.

9. The slicing machine according to claim 8, wherein the at least one of the drawer guides is pivotable between a mounting position pivoted towards the blade support and a loading position pivoted away from the blade support.

10. A slicing machine for slicing product calibers into slices, the slicing machine comprising:

a cutting unit including a blade shaft having a blade support, and a plate-shaped or bowl-shaped blade which is detachably fastenable to the blade support of the blade shaft and rotatably driveable about a blade axis, a feed unit for feeding at least one caliber in a feeding direction to the cutting unit, a discharge conveyor for discharging at least one separated slice, and a mounting device to facilitate mounting and dismounting of the blade at the blade support, wherein the mounting device comprises:

a blade carrier at which the blade is receivable, and drawer guides for receiving the blade carrier as a drawer between the drawer guides when the blade carrier is moved in a guide direction along the drawer guides, wherein the blade carrier is configured to temporarily receive the blade on a side of the blade carrier facing the blade support when the blade carrier is received in the drawer guides, and wherein the blade carrier is movable back and forth along the drawer guides between a position just guided in the drawer guides, and a loading position in which the blade axis of the blade held on the drawer guides is located at a same transverse position in a transverse direction as the blade axis of the blade when the blade is mounted on the blade support.

11. A slicing machine for slicing product calibers into slices, the slicing machine comprising:

a cutting unit including a blade shaft having a blade support, and a plate-shaped or bowl-shaped blade which is detachably fastenable to the blade support of the blade shaft and rotatably driveable about a blade axis, a feed unit for feeding at least one caliber in a feeding direction to the cutting unit, a discharge conveyor for discharging at least one separated slice, and a mounting device to facilitate mounting and dismounting of the blade at the blade support, wherein the mounting device comprises:

a blade carrier at which the blade is receivable, and drawer guides for receiving the blade carrier as a drawer between the drawer guides when the blade carrier is moved in a guide direction along the drawer guides, wherein the blade carrier is configured to temporarily receive the blade on a side of the blade carrier facing the blade support when the blade carrier is received in the drawer guides, and wherein at least one of the drawer guides is pivotable between a mounting position pivoted towards the blade support and a loading position pivoted away from the blade support.

12. The slicing machine according to claim 11, wherein the blade can be held in a defined position at the blade carrier, and the blade carrier is movable between a mounting position close to the blade shaft and either a loading position for removal from the slicing machine, or a protective position for covering the blade during a slicing operation.

13. The slicing machine according to claim 12, wherein a carrier holding device is provided to fix the blade carrier in the mounting position.

14. The slicing machine according to claim 12, wherein a blade holding device is provided on the blade carrier to fix the blade in the defined position on the blade carrier.

15. The slicing machine according to claim 12, wherein the blade carrier has a recess which is dimensioned and positioned in such a way that, when the blade is correctly positioned on the blade carrier all screw holes of the blade are aligned with the recess, and with the blade carrier in the mounting position on the slicing machine, a balancing weight present on the blade support extends into the recess.

16. The slicing machine according to claim 11, wherein the guide direction is transverse to the blade axis.

* * * * *